Patented Oct. 12, 1954

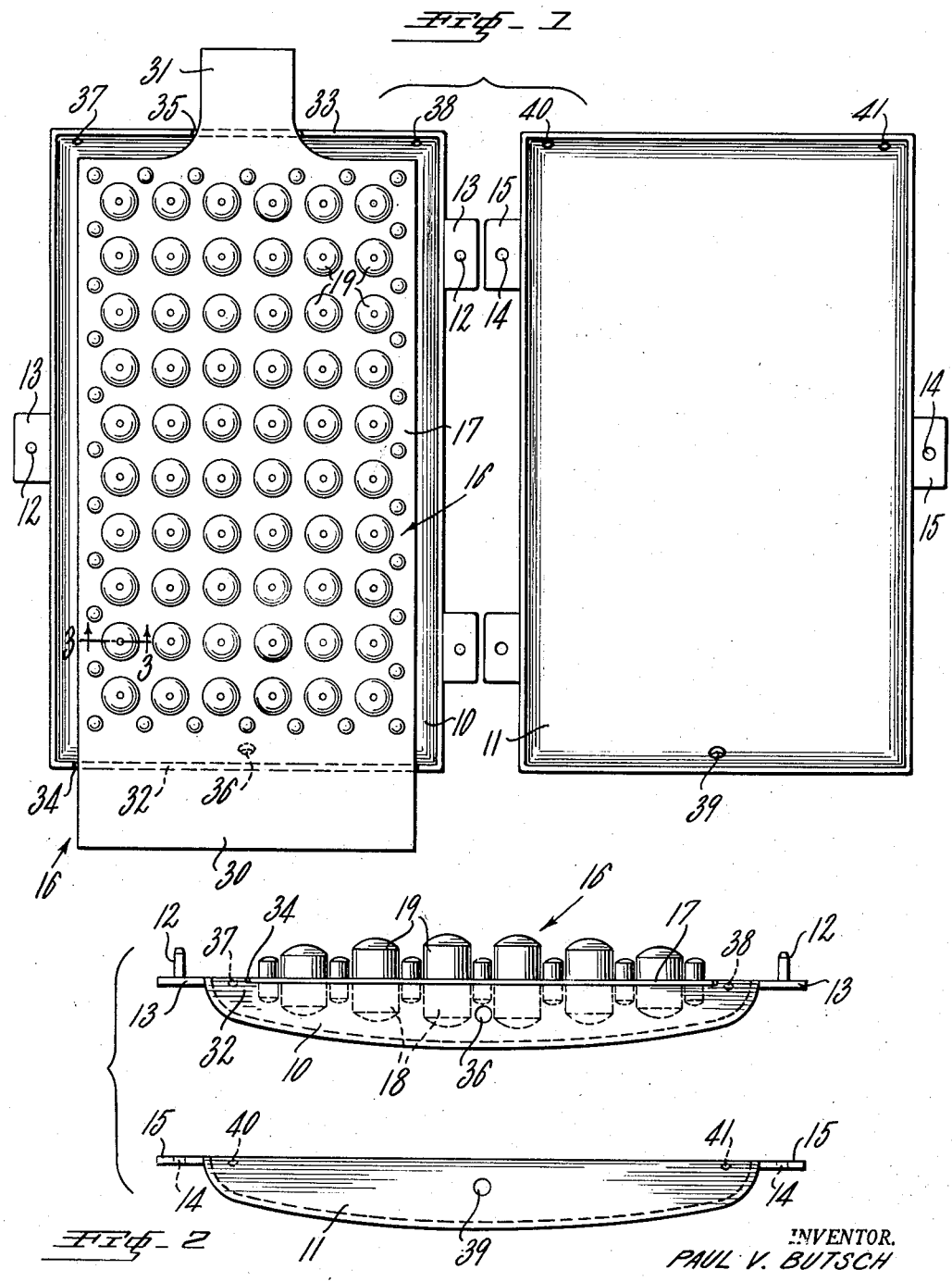

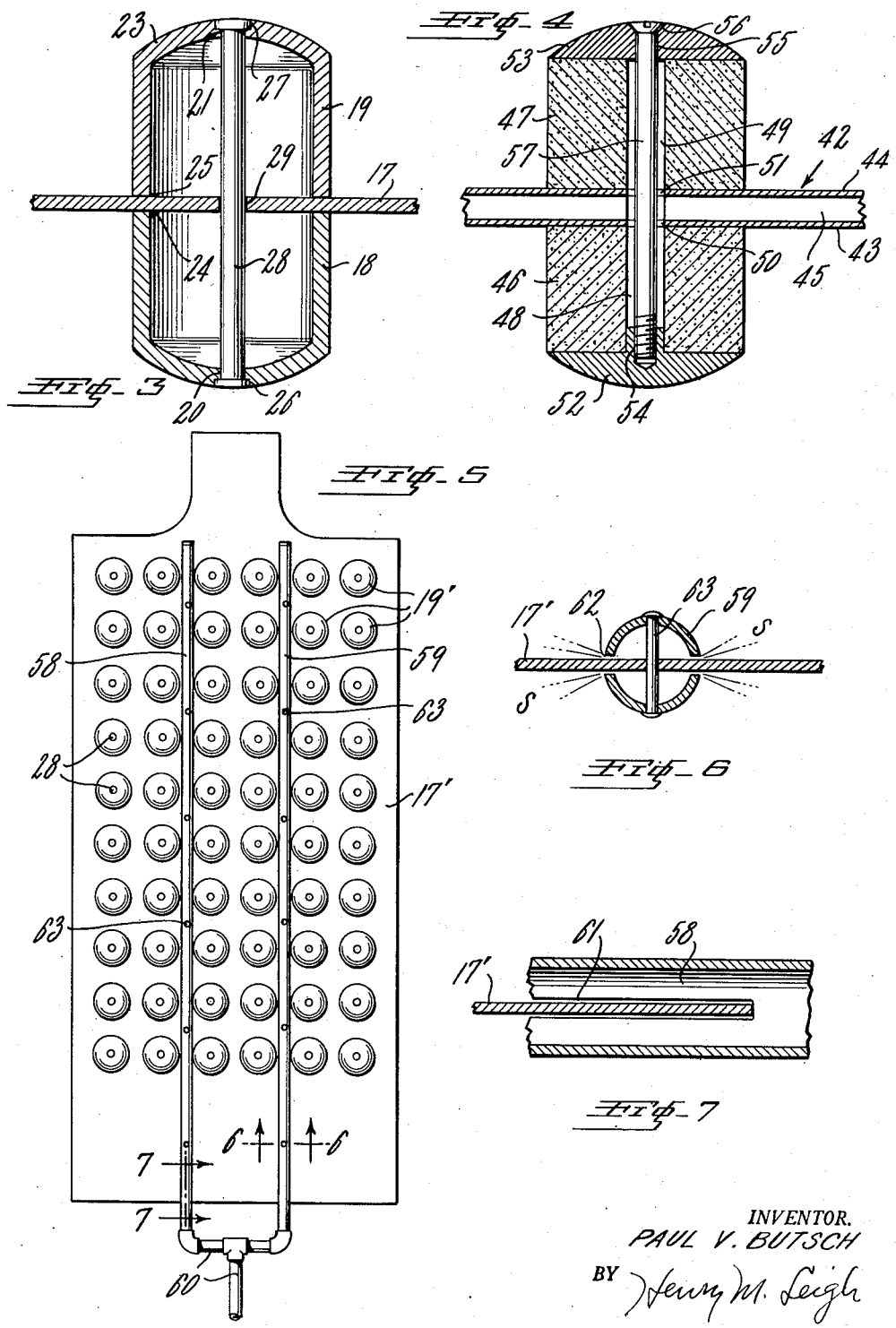

2,691,191

UNITED STATES PATENT OFFICE 2,691,191

METHOD AND APPARATUS FOR MAKING REVERSIBLE SPONGE CUSHIONS

Paul V. Butsch, South Bend, Ind., assignor to United States Rubber Company, New York, N. Y., a corporation of New Jersey Application April 2, 1951, Serial No. 218,867

5 Claims. (Cl. 18—39)

1

This invention relates to reversible one-piece molded cushions of sponge rubber or like material having a plurality of internal parallel spaced tubular-shaped cavities, and method and apparatus for making same.

Non-reversible or so-called open-type foam sponge cushions for seat and back cushions for automobiles and upholstery are made of a unitary molded construction of the desired shape with substantially parallel spaced openings or cored-out cavities extending from the base of the cushion toward the opposite face but terminating short of such opposite face to provide a smooth seating or back-resting surface of the cushion. The cavities are formed by cores extending into the mold proper into which the latex foam is poured, as shown in U. S. Patents Nos. 2,310,830 and 2,347,117. The latex foam is gelled and vulcanized and the vulcanized sponge cushions which have a smooth skin formation on the outer surfaces from contact with the smooth inner mold surface are manually stripped from the molds. Stripping is a time consuming operation and must be done with great care to avoid tearing the foam rubber sponge. Reversible cushions are made by cementing together two molded half-sections of foam sponge cushions, which are similar to open-type cushions, the surfaces from which the core openings extend being cemented together. Before cementing, the half sections are tested for compression resistance and those having the same resistance are matched. The entire outer surface of such a cushion has a smooth skin formation since the halves were molded against the smooth inside surface of the mold, the only break in the continuity of such smooth outer surface of the cushion being the fine lined butt joint, which is not objectionable, running around the side of the cushion intermediate to the top and bottom faces where the inner surfaces of the half sections were cemented at their edge portions. Such a cushion has a plurality of internal parallel spaced tubular-shaped cavities formed from the cored openings in the molded half-sections. Reversible cushions of various types, seat and back cushions and bed pillows, have been made in this manner, as shown in U. S. Patent 2,315,391. Because two molded half-sections are required to produce each cushion, the damage due to stripping is high. Other disadvantages are that each half-section must be trimmed of flash and carefully matched with another having the same compression resistance and then cemented together. Also, the manufacture of such reversible cushions has an additional disadvantage in the larger number of

2 molds and increased vulcanizer space that are needed.

The object of the present invention is to manufacture in a single molded piece reversible cushions of a spongy rubber-like material such as from foamed rubber latex having a plurality of internal parallel spaced tubular-shaped cavities and a smooth skin texture over their entire exposed surface.

The foregoing and other objects are accomplished as pointed out hereinafter and as shown in the accompanying drawings which:

Figure 1 is a top view of a pair of mold sections with a core assembly in position in one mold section;

Figure 2 is an end elevation of the mold sections of Fig. 1;

Figure 3 is an enlarged detail cross sectional view of a core element of the core assembly on the line 3—3 of Fig. 1;

Figure 4 is an enlarged detail cross sectional view of another embodiment of a core element of the core assembly which permits steam to be introduced through the core element into the interior of a molded sponge cushion to vulcanize the same;

Figure 5 is a top view of a modified core assembly from that drawn in Fig. 1 with an auxiliary means attached thereto for permitting steam to be introduced into the interior of a molded sponge cushion to vulcanize the same;

Figure 6 is an enlarged view on the line 6—6 of Fig. 5; and

Figure 7 is an enlarged view on the line 7—7 of Fig. 5.

The cushion of the present invention is preferably made of foamed rubber latex. Foamed rubber latex, natural and/or synthetic, may be prepared by whipping the compounded latex containing a foaming agent into a froth or foam, or by stirring the compounded latex into a separately prepared froth or foam. The latex may also be foamed by chemically evolving a gas in the latex as by the decomposition of hydrogen peroxide or a carbonate in the latex in known manner. The latex from which the foam is prepared or the thus prepared latex foam may have a delayed coagulant or gelling agent added to it before the foam is poured into molds or onto conveyors. The foam may be gelled and vulcanized and the sponge rubber product stripped from the molds or conveyor. The technique of preparing latex foams, and molding and gelling and vulcanizing the same is conventional today as illustrated in various patents, such as U. S. Patents 1,852,447, 2,126,275, 2,290,729, 2,309,005, 2,347,117 and 2,441,235. The reversible cushion of the present invention is molded in a single piece in the mold constructed in accordance with the present invention. On stripping from the mold surface, the cushion will have a desirable smooth outer skin formation from being molded against the smooth inner surface of the mold.

Referring more particularly to Figs. 1 and 2, the cushion mold in open position shown therein is made of metal and comprises two registering cavitied mold sections or halves 10 and 11. Pins 12 on lugs or ears 13 on the sides of the mold section 10 at the rim thereof register with holes 14 in the corresponding lugs or ears 15 of the mold section 11 so that the mold sections may be opened or separated for removal of the finished cushion, and closed in register for filling the hollow formed by the cavities in the mold sections with latex foam for shaping and gelling in the usual manner of making foam sponge cushions. The mold section 10 is provided with a removable core assembly 16 about which the latex foam is molded when the mold sections are in closed position, and which produces the plurality of internal parallel spaced tubular shaped cavities in the final molded cushion.

The core assembly 16 is composed of a core-bearing plate 17 of thin metal with a plurality of spaced parallel disposed tubular metal cores 18 and 19 attached to opposite sides of the plate 17 as shown in detail in Fig. 3. The tubular cores 18 and 19 are cup-shaped and have holes 20 and 21 drilled in the bottom cup surface or ends 22 and 23, the opposite ends 24 and 25 of the tubular cores being open. The height of the tubular cores 18 and 19 is less than the depth of the cavities in the mold sections. The holes 20 and 21 are countersunk at 26 and 27. The tubular cores are assembled on opposite sides of the plate 16 and a metal rod 28 is inserted through the holes 20 and 21 of the closed tube ends and aligned hole 29 in the plate 17. The metal rod 28 is peened over on the ends like a rivet, the excess metal filling in the countersunk portions of the holes in the ends of the tubular cores. The rough edges of the peened ends are ground off and buffed to produce a smooth external surface as shown in Fig. 3. The tubular cores 18 and 19 are shown round in cross section, but may be of any desired cross section, eliptical, triangular, square or any polygonal shape.

As shown in Fig. 1, end portions 30 and 31 of the plate 17 project outside the ends 32 and 33 of the mold body and support the core assembly 16 on the end portions of the mold section 10. The width of the plate 17 is less than the width of the mold cavity, thereby retaining communication between the cavities in mold sections 10 and 11 when in closed position to produce an integral molded single piece cushion. The width of the projected portion of the plate 17 at the end 30 is equal to the width of the body of the plate. This insures an adequate slit in the finished cushion for removing the core assembly by stripping the molded cushion, as will be explained later. At the other end 31, the plate has been decreased in width to form a narrow tail, but of sufficient width to support the core assembly on the rim of the mold section 10 at the end 33. Where the portions of the plate 17 contact the interior surface of the mold ends 32 and 33, there will be slits formed in the cushion, which can be cemented later, if desired. As explained, the tubular cores 18 and 19 and the longitudinal edges of the plate 17 will be spaced from the interior surface of the mold in closed position so that communication between the cavities in the mold sections is not severed. The rim of the mold section 10 is channeled at the ends 32 and 33 with grooves 34 and 35 of a depth the thickness of plate 17 to cause the top of plate 17 to be flush with the rim of the mold section 10 to provide a tight fit at the parting line with the mold section 11 when the mold sections are in closed position. If desired, the ends 30 and 31 of the plate 17 need not extend through the wall of the mold in the grooves 34 and 35, but may terminate at the outer surface of the mold. If desired, the ends 30 and 31 of the plate 17 may terminate intermediate the inner and outer surfaces of the mold, as on interior grooves on the rim at the ends 32 and 33 of the mold section 10. If desired, a shelf or ledge at the ends 33 and 34 below the rim of the mold section 10 and extending into the mold cavity, can be made to support the ends of the plate 17, in which case the length of the plate 17 can be less than the inside length of the mold at the mid-line. The plate 17 may be positioned and supported in the hollow of the mold at other portions of its surface than the two ends, if desired. The mold section 10 is provided with a port 36 for the introduction of latex foam into the closed mold and air vents 37 and 38 for aid in filling the mold with foam. Mold section 11 is similarly provided with a port 39 for the introduction of latex and with air vents 40 and 41.

In practice, the core assembly 16 is placed on the grooves 34 and 35 on the rim of the mold section 10, as shown in Figs. 1 and 2, and the mold section 11 is placed on the mold half 10 with the cavities of the mold sections in register to form the closed mold. Latex foam is introduced into the cavities of the mold sections through the ports 36 and 39 until foam exudes through air vents 37, 38, 40 and 41. If desired, the two mold sections may be separately filled with foam by pouring into the open sections and the core assembly then positioned in the grooves 34 and 35 on the mold section 10. The foam is stiff enough to remain in the mold section 11 while it is lifted onto the mold section 10 to form the closed mold. In such case, the entrance ports 36 and 39 and/or the air vents 37, 38, 40 and 41 may be omitted from the mold construction, if desired. The mold filled with foam is passed through a heating chamber to gel the foam and vulcanize the cushion, or the foam may be gelled at room temperature on standing in the mold followed by vulcanization at elevated temperature. After vulcanizing, the cushion is removed from the mold with the core assembly still inside the cushion. The core assembly can be readily removed through the slit in the end of the cushion made by the end 30 of the plate 17 contacting the interior surface of the mold at the mold end 32. Starting from this open end, the cushion is stripped back on itself, and when completely separated from the core assembly, the cushion is inside out and may be reversed. The open end of the cushion may be cemented together. The slit made by the opposite reduced end 31 of the plate 17 contacting the interior surface of the mold at the mold end 33, may also be cemented together if desired. However, the slit is generally small enough not to be noticed, and if left uncemented, has the advantage of allowing air to readily escape from the interior of the pillow, thus overcoming the objection that many people have to foam sponge pillows in that they "fight back." In other words, it makes the pillow immediately responsive to changes in pressure, as when one lays his head on the pillow and compresses it.

The core assembly may be flexible, as when made of rubber, by using the core assembly of Figs. 1 to 3, as a form for latex dipping, stripping the latex dipped rubber core from the metal form, and cementing any cuts necessary to remove the metal form. Such a rubber core is hollow and may be connected to a vacuum for facilitating removal from the interior of molded sponge cushions. However, no difficulty has been found in removing the metal core assembly of Figs. 1 to 3 from molded sponge cushions.

Modifications of the construction of the core assembly which very materially reduce the time for vulcanizing the sponge cushions, are shown in Fig. 4 and Figs. 5 to 7. With these modifications, steam is introduced directly into the interior of the sponge cushion in the mold to vulcanize the cushion. The foam in the mold may be gelled on standing at room temperature and the gelled sponge vulcanized by introducing steam directly into the interior of the sponge.

In the first modification of the core assembly of Figs. 1 to 3 to provide a source of steam associated with the core assembly, the plate 17 is made hollow and closed around the periphery, and is connected to a steam supply at any desired point, as at the end 30 or 31. A number of the tubular core elements at various desired positions in the core assembly are constructed of porous or perforate material, so that the steam from the hollow plate will be directed through the porous or perforate core elements into direct contact with the sponge to vulcanize the same. In the core assembly of Fig. 1, four such porous or perforate tubular core elements on each side of the plate distributed over the surface are sufficient. One form of such a porous tubular core element on each side of the hollow plate is shown in Fig. 4 in which the hollow plate 42 takes the place of solid plate 17 of Figs. 1 to 3. The hollow plate 42 comprises lower and upper spaced surfaces 43 and 44 with an intermediate space 45 which is connected to a steam supply as above described when it is desired to vulcanize the sponge. The tubular core elements that are not porous are the same as core elements 18 and 19 of Figs. 1 to 3, and are assembled to the plate 42 the same as to the plate 17 as shown in detail in Fig. 3. As shown in Fig. 4, the porous tubular core elements comprise cylinders of porous carbon 46 and 47 which have holes 48 and 49 drilled through the center. The cylinders 46 and 47 are placed on opposite sides of the plate 42 in alignment with holes 50 and 51 in the lower and upper surfaces 43 and 44 of the plate 42. Metal discs 52 and 53 are assembled over the exposed ends of cylinders 46 and 47, respectively. Disc 52 has a blind tapped hole 54 and disc 53 has a center hole 55 countersunk at 56 on the outside. A bolt 57 slides through the hole 55 of the disc 53, the hole 49 of the porous cylinder 47, the holes 51 and 50 of the plate 42, the hole 48 of the porous cylinder 46 and screws into the blind tapped hole 54 of the disc 52. By tightening up the bolt, the discs exert pressure on the cylinders 46 and 47 and hold them in place. In practice, the foam is molded, as described above, for Figs. 1 to 3, but for vulcanization of the sponge rubber surrounding the core assembly, steam enters through the hollow plate 42, passes through the holes 48 and 49 in the center of the porous cores 46 and 47, and out through the porous walls of the cores into contact with the interior of the sponge to cure the same.

Another modification of the core assembly of Figs. 1 to 3 to provide a source of steam associated with the core assembly for vulcanizing the sponge by introducing steam into the interior thereof, is shown in Figs. 5 to 7. The main core assembly is the same as in Figs. 1 to 3 with the plate 17' to which is attached tubular core elements on each side, as shown in detail in Fig. 3 and at 19' in Fig. 5. For introducing steam into the molded foam in the hollow of the mold, two slotted pipes 58 and 59 are provided lengthwise of the plate 17' and riveted thereto as shown in detail in Fig. 6. The slotted pipes 58 and 59 are connected to a header unit 60 and a steam supply not shown. The pipes 58 and 59 are slotted at 61 and 62 respectively, for the length of the plate 17' that it is desired to introduce the steam. The width of the slots 61 and 62 of the pipes 58 and 59 is just in excess of the thickness of the plate 17'. This permits the plate 17' to be inserted in the slot of the pipes. Holes are drilled through the pipes and plate at desired intervals to facilitate riveting the pipe to the plate with rivets 63, as shown in detail in Fig. 6. Because there is a slight space between the slots in the pipes 58 and 59 and the plate 17' against which it is held by the rivets 63, the steam escapes as indicated at S in Fig. 6. Thus there is a uniform amount of steam introduced along the length of the pipes on each side of the plate of the mold assembly to vulcanize the foam sponge rubber in the mold by introducing the steam directly into the interior of the sponge cushions.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. Apparatus for molding reversible foam sponge cushions comprising registering mold sections having cavities which cooperate to form the hollow of the mold for shaping a foam sponge cushion therein, a removable unitary core assembly comprising a plurality of spaced substantially parallel disposed tubular cores, and means associated with the parting line of the mold sections for supporting said core assembly in the hollow of the mold when in closed position while retaining communication between said cavities of said mold sections, said core assembly comprising means for introducing steam into the interior of a sponge rubber article formed around said core assembly in the mold to vulcanize the same.

2. Apparatus for molding reversible foam sponge cushions comprising registering mold sections having cavities which cooperate to form the hollow of the mold for shaping a foam sponge cushion therein, a removable core assembly comprising a plate and a plurality of spaced substantially parallel disposed tubular cores on each side of said plate, the width of said plate being less than the width of the mold cavity, and means for supporting the end portions of said plate at the parting line of the mold sections to position the core assembly in the hollow of the mold when in closed position while retaining communication between the cavities of said mold section.

3. Apparatus for molding reversible foam sponge cushions comprising registering mold sections having cavities which cooperate to form the hollow of the mold for shaping a foam sponge cushion therein, a removable core assembly comprising a plate and a plurality of spaced substantially parallel disposed tubular cores on each side of said plate, and means for positioning a portion only of said plate at a portion only of the parting line of the mold sections to support said core assembly in the hollow of the mold when in closed position without completely severing communication between said cavities of said mold sections, said core assembly comprising means for introducing steam into the interior of a sponge rubber article formed around said core assembly in the mold to vulcanize the same.

4. Apparatus for molding reversible foam sponge cushions comprising registering mold sections having cavities which cooperate to form the hollow of the mold for shaping a foam sponge cushion therein, a removable core assembly comprising a plurality of spaced substantially parallel disposed tubular cores, and means for supporting said core assembly in the hollow of the mold when in closed position while retaining communication between said cavities of said mold sections, said core assembly comprising means for introducing steam into the interior of a sponge rubber article formed around said core assembly in the mold to vulcanize the same.

5. The method of making a reversible one-piece molded cushion of sponge rubber or like material having a plurality of internal substantially parallel-spaced tubular shaped cavities which comprises introducing latex foam into closed sections of a cushion-shaped hollow mold having a unitary core assembly comprising a plurality of spaced substantially parallel disposed tubular cores supported in the hollow of the mold while retaining communication between the interior portions of the mold sections, gelling the latex foam in the mold to form sponge rubber, removing the thus formed sponge cushion with the core assembly therein from the mold, and separating the core assembly from the sponge cushion through a slit in the surface of the cushion.

References Cited in the file of this patent

UNITED STATES PATENTS

| Number | Name | Date |
| --- | --- | --- |
| 1,934,547 | Little | Nov. 7, 1933 |
| 2,346,335 | Sidnell | Apr. 11, 1944 |
| 2,351,529 | Luxenberger et al. | June 13, 1944 |
| 2,368,327 | Rose | Jan. 30, 1945 |
| 2,537,089 | Rempel | Jan. 9, 1951 |